May 6, 1930.  B. W. ROWLAND  1,757,928
METHOD OF MANUFACTURING RUBBER ARTICLES
Filed Nov. 10, 1928
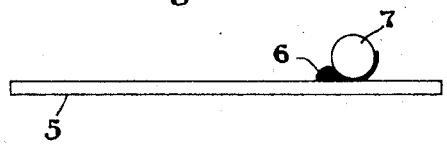
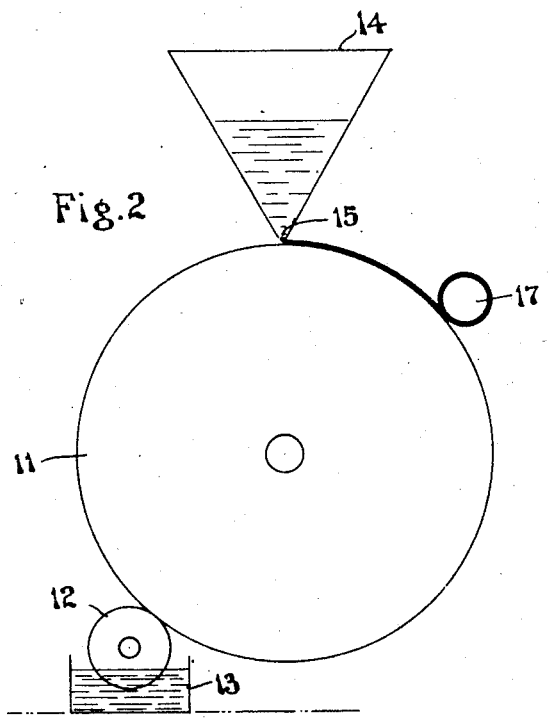
Inventor
Ben W. Rowland
By
Attorney Patented May 6, 1930

1,757,928

UNITED STATES PATENT OFFICE

BEN W. ROWLAND, OF AKRON, OHIO, ASSIGNOR TO THE GOODYEAR TIRE & RUBBER COMPANY, OF AKRON, OHIO, A CORPORATION OF OHIO

METHOD OF MANUFACTURING RUBBER ARTICLES

Application filed November 10, 1928. Serial No. 318,385.

This invention relates to methods of and apparatus for manufacturing rubber articles, and it has particular relation to methods of manufacturing such articles by the coagulation of rubber from suspensions or emulsions, such as latex, thereby obviating the necessity of subjecting the rubber to the conventional process of plasticization and compounding upon a mill.

One object of the invention is to provide a novel method of preparing rubber articles whereby the expenditure of power and labor in compounding the rubber with pigments and other compounding ingredients is obviated.

Another object of the invention is to provide a rubber product having greater elasticity and greater resistance to tear and to aging, than is ordinarily possessed by goods manufactured by the conventional methods.

It has heretofore been observed that the milling of rubber, particularly if prolonged, tended to break down the globular structure inherent in crude unmilled rubber. This breaking down of the structure of the rubber tended to produce excessive plasticity and to reduce the tensile strength of the product.

This invention consists in the provision of a novel method of manufacturing rubber articles directly from latex, thereby dispensing with the conventional steps of milling the compound. According to this method, an emulsion of rubber containing the requisite compounding ingredients, is spread upon a suitable form, preferably, though not necessarily, in a partially coagulated state, and is there subjected to complete coagulation by some convenient means.

For a better understanding of the invention, reference may now be had to the accompanying drawings, forming a part of the specification, of which:

Figure 1 is a diagrammatical view of an apparatus whereby the process may be practiced; and Figure 2 is a diagrammatical view of a somewhat more elaborate form of apparatus peculiarly adapted for the manufacture of inner tubes or other hollow cylindrical articles.

In order to manufacture an inner tube or other hollow article by means of the apparatus disclosed in Figure 1, a smooth table or surface 5 of any convenient material which is capable of withstanding the action of chemicals is treated upon the top surface thereof with a solution of rubber coagulant or precipitant, such as acetic acid or acetone. A quantity of paste 6 consisting of concentrated latex containing the necessary compounding ingredients is then disposed upon the surface, preferably with but slight spreading, after which a mandrel 7, which has first been coated with a film of rubber precipitant, is rolled across the surface. The latex containing the compounding ingredients, upon coming into contact with the precipitant upon the mandrel, is coagulated at the points of contact, thereby causing adhesion between the coagulated rubber and the surface of the mandrel. As the mandrel progresses across the table, the latex is forced in advance thereof, and a thin lower film which comes into contact with the coagulant is precipitated. If the concentration of the coagulant is correct, the underside of the film will be comparatively firm and non-adhesive, while the upper surface remains soft and tacky, so that as the film is rolled up by the mandrel, the tacky surface of one layer tends to adhere to the firm surface of the preceding layer. The coagulant remaining upon the firm side of each layer is brought into intimate contact with the tacky, partially coagulated surface of the succeeding layer, thus effecting complete coagulation of the film. In this manner, a layer of coagulated rubber is gradually formed upon the surface of the mandrel from the thin films of material picked up from the surface over which the mandrel is being rolled. After a sufficient thickness of rubber has been formed upon the mandrel, rolling is discontinued, and the edge portions of the rubber upon the mandrel are trimmed away. The article is then dried and subjected to vulcanization upon the mandrel in the usual manner, or it may, by the aid of a water-suspension of soapstone, be removed, then washed, dried and vulcanized in any suitable manner.

In Figure 2 is illustrated an apparatus whereby inner tubes and similar articles may be formed of latex upon mandrels at a higher rate of speed than that possible with the apparatus illustrated in Figure 1. This apparatus comprises a rotatably driven cylinder or drum 11, the outer surface of which corresponds to the surface of the table 5. The surface of the drum is continually moistened with a rubber precipitant by means of a roller 12 which contacts therewith and which dips into a solution of precipitant contained in a trough 13. Latex containing the proper compounding ingredients is stored in a hopper-like vessel 14 disposed above the drum, and escapes from the hopper to the surface of the drum through a narrow slit or opening 15 at the bottom of the vessel. The film of coagulated latex is removed from the surface of the drum by winding it upon a mandrel 17, whereby to form the article.

Various emulsions of rubber, either vulcanized or unvulcanized, may be employed in practicing the invention, although natural latex is preferable, because the rubber is thus obtained in suspension without any intermediate steps of emulsification. The latex may be intermixed with various kinds and proportions of compounding materials. The following are examples of formulæ which are found suitable for the purpose:

|  | Parts |
|---|---|
| Rubber contained in concentrated latex | 100 |
| Zinc oxide | 5 |
| Sulphur | 3 |
| Mercaptobenzothiazole | 1 |

The zinc oxide, sulphur and mercaptobenzothiazole are preferably ground together with a little ammonia to form a paste, which does not coagulate the latex upon being added thereto. Articles formed of this compound may be cured by subjecting them to vulcanization for a period of one hour at a temperature corresponding to that of saturated steam at a pressure of twenty pounds per square inch.

The following is another formula which has also been found satisfactory:

|  | Parts |
|---|---|
| Rubber contained in concentrated latex | 100 |
| Colloidal barium sulphide, in the form of a paste | 90 |
| Zinc oxide | 5 |
| Sulphur | 3 |
| Mercaptobenzothiazole | 0.5 |

This compound is cured by subjecting it to vulcanization for a period of fifteen minutes at a temperature corresponding to that of steam at 40 pounds pressure per square inch.

Any fairly active latex coagulant may be employed for effecting precipitation of the rubber in the latex, although acetic acid is the most satisfactory material for this purpose thus far found. The concentration of the acid, for best results, should be approximately 40%, but this value may be varied somewhat. If the concentration is too high, the coagulating action may be so great that the rubber contained in a film upon the mandrel is so completely set before the mandrel has made a revolution as to prevent the layers of rubber from bonding together to form a unitary structure. Articles consisting of a number of individual laminations are thus formed.

Practice of this invention permits the incorporation of the sulphur and other compounding materials into the rubber with a minimum expenditure of power and time. These compounding ingredients are distributed uniformly through the rubber. Furthermore, the natural antioxidants and accelerators which are present in latex appear to remain in the rubber to a much greater extent than when the rubber is treated in the usual manner.

Although I have illustrated only the preferred forms which the invention may assume, it will be apparent to those skilled in the art that it is not so limited, but that various modifications may be made therein without departing from the spirit of the invention or from the scope of the appended claims.

What I claim is:

1. A method of manufacturing rubber articles which comprises applying continuous convolutions of a film of a suspension of rubber to the surface of a form and coagulating the rubber in the suspension by the application of a coagulant to the surface of said film.

2. A method of forming rubber articles which comprises applying successive convolutions of a continuous film of a rubber suspension to the surface of a form, while applying a coagulant to the surface of each successive convolution before the addition of the succeeding convolution.

3. A method of forming rubber articles which comprises winding a continuous film of latex containing compounding ingredients in a plurality of convolutions about the surface of a form, while applying a coagulant to the surface of the film.

4. A method of forming rubber articles which comprises applying a film of a rubber coagulant to a working surface, applying a quantity of a rubber suspension containing compounding ingredients to said surface, and then rolling a form across the suspension thereby causing the latter to adhere as a coating film to the surface of the form.

5. A method of forming rubber articles which comprises applying a film of a rubber coagulant to a working surface, applying a quantity of a rubber suspension containing compounding ingredients to said surface, and then rolling a form coated with a coagulating solution across the suspension, thereby causing the latter to adhere as a coating film to the surface of the form.

6. A method of forming rubber articles which comprises applying a film of a rubber coagulant to a working surface, then disposing a quantity of latex containing compounding ingredients upon the surface, and rolling a mandrel, also coated with a film of rubber coagulant, across the latex, thereby causing the latex to be coagulated and to adhere to the surface of the mandrel.

7. A method of forming rubber articles which comprises moistening the surface of a continuously moving drum with a rubber coagulant, pouring latex containing the requisite compounding ingredients upon the moistened surface, pressing a mandrel which has been moistened with a rubber coagulant against the surface of the drum, thereby causing the film of freshly coagulated latex to adhere to the mandrel.

8. A method of forming rubber articles which comprises partially coagulating a film of a rubber suspension, winding the film upon a form and then completely coagulating the film.

9. A method of forming rubber articles which comprises partially coagulating a film of latex, winding it upon a form and then completing coagulation thereof.

10. A method of forming rubber articles which comprises partially coagulating a film of latex, winding it in a plurality of convolutions about a form and then completing the process of coagulation.

11. A process of forming rubber articles which comprises applying a coagulant to one side of a film of latex, winding the film about a form and then completing the process of coagulation.

12. A method of forming rubber articles which comprises rotating a pair of cylinders in contact with each other, applying a coagulant to one of the cylinders, applying latex upon the coagulant and subsequently transferring the resulting coagulated film to the second cylinder.

In witness whereof I have hereunto signed my name at Akron, in the county of Summit and State of Ohio, U. S. A., this 9th day of November, 1928.

BEN W. ROWLAND.